(12) United States Patent
Hall-Goulle et al.

(10) Patent No.: US 11,008,700 B2
(45) Date of Patent: May 18, 2021

(54) PROCESS FOR PRINTING CELLULOSE CONTAINING TEXTILE FIBRE MATERIAL

(71) Applicant: Huntsman International LLC, The Woodlands, TX (US)

(72) Inventors: Veronique Hall-Goulle, Dornach (CH); Anton Andreoli, Itingen (CH); Luc Nueffer, Rixheim (FR); Luzia Cueni, Blauen (CH)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 16/497,827

(22) PCT Filed: Feb. 20, 2018

(86) PCT No.: PCT/EP2018/054078
§ 371 (c)(1),
(2) Date: Sep. 26, 2019

(87) PCT Pub. No.: WO2018/177652
PCT Pub. Date: Oct. 4, 2018

(65) Prior Publication Data
US 2020/0102699 A1 Apr. 2, 2020

(30) Foreign Application Priority Data

Mar. 29, 2017 (EP) ..................................... 17163574

(51) Int. Cl.
| | | |
|---|---|---|
| *D06P 1/20* | (2006.01) | |
| *C09B 1/32* | (2006.01) | |
| *D06P 5/00* | (2006.01) | |
| *D06P 5/24* | (2006.01) | |
| *D06P 5/30* | (2006.01) | |
| *D06P 3/54* | (2006.01) | |
| *D06P 3/60* | (2006.01) | |
| *D06P 3/82* | (2006.01) | |

(52) U.S. Cl.
CPC ................ *D06P 1/20* (2013.01); *C09B 1/325* (2013.01); *D06P 5/002* (2013.01); *D06P 5/009* (2013.01); *D06P 5/30* (2013.01); *D06P 3/54* (2013.01); *D06P 3/6041* (2013.01); *D06P 3/8233* (2013.01)

(58) Field of Classification Search
CPC ...... D06P 1/20; D06P 3/54; D06P 3/42; D06P 5/30; D06P 3/26; D06P 3/6041;
(Continued)

(56) References Cited

U.S. PATENT DOCUMENTS

| | | | | |
|---|---|---|---|---|
| 3,523,936 A | * | 8/1970 | Toji | ........................ C09B 1/325 534/829 |
| 3,794,463 A | * | 2/1974 | Neumer | ................ D06P 3/6033 8/532 |
| 6,607,565 B1 | * | 8/2003 | Herrmann | ........... C09B 67/0082 8/557 |

FOREIGN PATENT DOCUMENTS

| | | |
|---|---|---|
| DE | 1768724 A1 | 8/1971 |
| WO | 2004016849 A1 | 2/2004 |

(Continued)

*Primary Examiner* — Eisa B Elhilo
(74) *Attorney, Agent, or Firm* — Huntsman International LLC; Robert Diaz

(57) ABSTRACT

The invention relates to a process for printing cellulose textile fibre material or cellulose/polyester mixed textile fibre material, characterised in that the fibre material is treated with a printing paste or printing ink containing a disperse dye of the formula

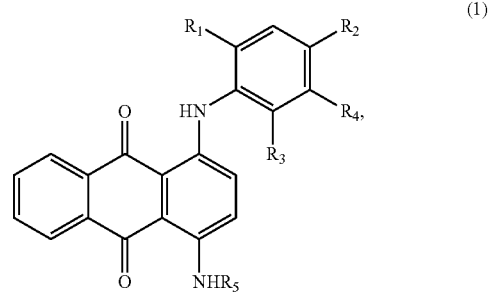

(1)

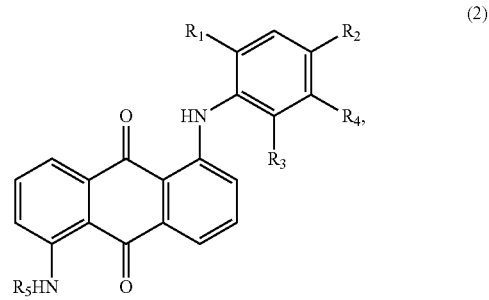

(2)

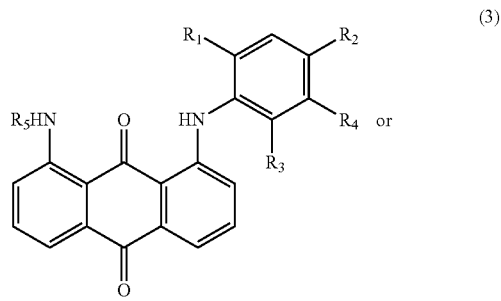

(3) or (Continued)

-continued

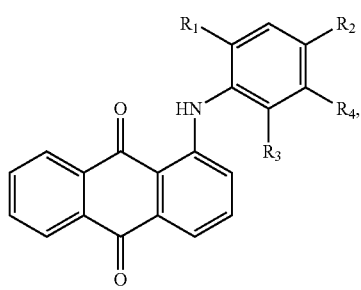
(4)

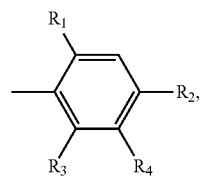

(5)

wherein $R_1$-$R_4$ are as defined above.

9 Claims, No Drawings wherein $R_1$-$R_3$ are each independently of the other hydrogen, halogen, $C_1$-$C_8$-alkyl or $C_1$-$C_8$-alkoxy, $R_4$ denotes hydrogen, $C_1$-$C_8$-alkyl or a group of the formula —$SO_2$—$NR_6R_7$, wherein $R_6$ and $R_7$ each independently of the other denote hydrogen, $C_1$-$C_8$-alkyl which is unsubstituted or substituted by hydroxy, halogen, $C_1$-$C_8$-alkoxy or $C_6$-$C_{24}$aryl, or $C_6$-$C_{30}$aralkyl which is unsubstituted or substituted by hydroxy, $C_1$-$C_8$alkyl, $C_1$-$C_8$alkoxy or halogen, $R_5$ represents hydrogen, $C_1$-$C_8$-alkyl or a radical of the formula

(58) Field of Classification Search
CPC ...... D06P 3/36; D06P 3/00; D06P 3/48; D06P 3/794; D06P 3/72; D06P 3/8233; D06P 3/004; D06P 5/002; D06P 3/82; D06P 3/043; D06P 3/143
USPC .................................. 8/464; 106/31.13
See application file for complete search history.

(56) References Cited

FOREIGN PATENT DOCUMENTS

| WO | WO 2004/016849 A1 * | 2/2004 | ................ D06P 3/82 |
|---|---|---|---|
| WO | 2005024123 A2 | 3/2005 | |

* cited by examiner

PROCESS FOR PRINTING CELLULOSE CONTAINING TEXTILE FIBRE MATERIAL

This application is the National Phase of International Application PCT/EP2018/054078 filed Feb. 20, 2018 which designated the U.S., and which claims priority to European App. Ser. No. 17163574.1 filed Mar. 29, 2017. The noted applications are incorporated herein by reference.

The present invention relates to a process for printing cellulose textile fibre material or cellulose/polyester mixed textile fibre material using disperse or solvent dyes.

Printing techniques like screen printing or inkjet printing have been used in the textile industry for some time mainly to impose a design on fabrics.

While cellulose fibres like cotton (CO) and linen are usually printed with reactive dyes, printing of synthetic fibre materials like polyester (PES) is typically performed by application of disperse dyes.

Many attempts have been made to develop efficient processes for printing PES/CO blends.

Usually reactive dyes or vat dyes are combined with disperse dyes.

However, the use of such dye mixtures is associated with several drawbacks and it is hardly possible to obtain the same shade and colour depth on the two fibres by this method.

Accordingly, there is a need for a printing method for PES/CO blends which works without a combination of reactive and disperse dyes and provides printings exhibiting good washfastness, lightfastness, colour strength and brilliance.

It has now surprisingly been found that a group of anthraquinone disperse or solvent dyes can successfully be printed on pure CO fibres as well as on CO/PES blend fabrics and provides brilliant printings having outstanding fastness properties and, in case of CO/PES blends, level dyeings on both the CO and PES parts.

The present invention accordingly relates to a process for printing cellulose textile fibre material or cellulose/polyester mixed textile fibre material, characterised in that the fibre material is treated with a printing paste or printing ink containing a disperse dye of the formula

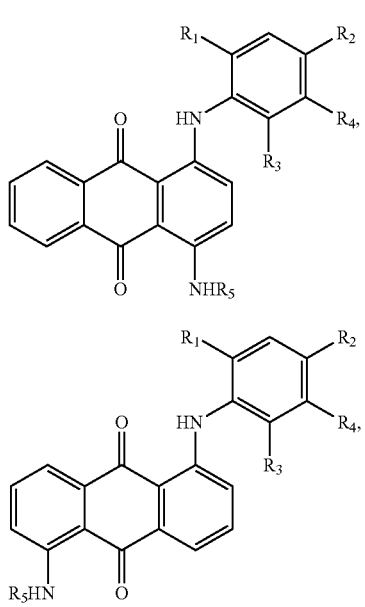

wherein
$R_1$-$R_3$ are each independently of the other hydrogen, halogen, $C_1$-$C_8$-alkyl or $C_1$-$C_8$-alkoxy,
$R_4$ denotes hydrogen, $C_1$-$C_8$-alkyl or a group of the formula —$SO_2$—$NR_6R_7$,
wherein $R_6$ and $R_7$ each independently of the other denote hydrogen,
$C_1$-$C_8$-alkyl which is unsubstituted or substituted by hydroxy, halogen, $C_1$-$C_8$-alkoxy or $C_6$-$C_{24}$aryl, or
$C_6$-$C_{30}$aralkyl, which is unsubstituted or substituted by hydroxy, $C_1$-$C_8$alkyl, $C_1$-$C_8$alkoxy or halogen,
$R_5$ represents hydrogen, $C_1$-$C_8$-alkyl or a radical of the formula

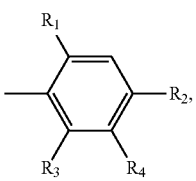

wherein $R_1$-$R_4$ are as defined above.

Any radical denoting alkyl may be a straight-chain or branched alkyl radical.

Examples of alkyl groups include methyl, ethyl, n-propyl, isopropyl, n-butyl, isobutyl, sec-butyl, tert-butyl, n-pentyl, isopentyl, neopentyl, n-hexyl and n-octyl.

$C_1$-$C_8$ alkoxy may be, for example, methoxy, ethoxy, n-propoxy, isopropoxy, n-butoxy, iso-butoxy, sec-butoxy, tert-butoxy, n-pentoxy, neopentoxy, n-hexoxy and n-octoxy.

Examples of suitable aryl groups are phenyl, tolyl, mesityl, isityl, 2-hydroxyphenyl, 4-hydroxyphenyl, 2-chlorophenyl, 4-chlorophenyl, 2,6-dichlorophenyl, 2-aminophenyl, 3-aminophenyl, 4-aminophenyl, 4-methoxyphenyl, 4-ethoxyphenyl, naphthyl and phenanthryl.

Examples of suitable $C_6$-$C_{30}$aralkyl groups are benzyl, 2-phenylethyl, tolylmethyl, mesitylmethyl and 4-chlorophenylmethyl.

Any radical denoting halogen may be fluorine, chlorine or bromine, in particular chlorine or bromine.

Preferably, a dye of the formula (1), (2), (3) or (4), wherein $R_1$-$R_3$ are $C_1$-$C_8$-alkyl is applied in the process according to the invention.

Further preferred dyes of the formula (1), (2), (3) or (4) are those, wherein $R_4$ denotes a radical of the formula —$SO_2$—$NR_6R_7$, wherein Re and $R_7$ are as defined above.

Moreover, dyes of the formula (1), (2) or (3) are preferred, wherein $R_5$ is a radical of the formula (5), wherein $R_1$-$R_3$ are $C_1$-$C_6$-alkyl.

Furthermore, printing pastes and printing inks are preferred containing a containing a disperse dye of the formula (1), (2) or (3), wherein $R_5$ is a radical of the formula (5) wherein $R_4$ is —$SO_2$—$NR_6R_7$, wherein Re and $R_7$ are as defined above.

Particularly preferred are printing pastes and printing inks containing a disperse dye of the formula (1), wherein $R_1$-$R_3$ are $C_1$-$C_8$-alkyl, $R_4$ is hydrogen or a radical of the formula —$SO_2$—$NR_6R_7$, wherein Re is hydrogen and $R_7$ is 3-methoxypropyl, $R_5$ is a radical of the formula (5), wherein $R_1$-$R_3$ are $C_1$-$C_8$-alkyl and $R_4$ is hydrogen or a radical of the formula —$SO_2$—$NR_6R_7$, wherein Re is hydrogen and $R_7$ is 3-methoxypropyl.

The compounds of formulae (1) to (4) are known and either commercially available or can be prepared according to known processes.

Examples for suitable dyes of formulae (1) to (3) are the following compounds: CAS-No. 4395-65-7, CAS-No. 3179-96-2, CAS-No. 6471-00-7, CAS-No. 39774-73-7, CAS-No. 476208-42-1, CAS-No. 128-85-8, CAS-No. 60683-36-5, CAS-No. 107535-87-5, CAS-No. 873981-73-8, CAS-No. 2944-12-9, CAS-No. 19286-75-0, CAS-No. 2944-26-5, CAS-No. 2944-27-6, CAS-No. 28141-00-6, CAS-No. 95950-90-6, CAS-No. 194868-46-7, CAS-No. 733043-14-6, CAS-No. 860529-86-8, CAS-No. 68516-76-7, CAS-No. 75333-01-6, CAS-No. 75312-58-2, CAS-No. 1802255-54-4, CAS-No. 14827-26-0, CAS-No. 68239-77-0, CAS-No. 7639-96-5, CAS-No. 23851-51-6, CAS-No. 74440-70-3, CAS-No. 75300-15-1, CAS-No. 75332-17-1, CAS-No. 90332-35-7, CAS-No. 14827-27-1, CAS-No. 501075-76-9, CAS-No. 1269195-04-1, CAS-No. 116-74-5, CAS-No. 23851-49-2, CAS-No. 32724-62-2, CAS-No. 37780-72-6, CAS-No. 51287-59-3, CAS-No. 79817-56-4, CAS-No. 17354-14-2, CAS-No. 14233-37-5, CAS-No. 348574-68-5, CAS-No. 501075-78-1, CAS-No. 20241-74-1, CAS-No. 41611-76-1, CAS-No. 73295-31-5, CAS-No. 140480-34-8, CAS-No. 348574-66-3, CAS-No. 348574-71-0, CAS-No. 860529-87-9, CAS-No. 17407-02-2, CAS-No. 51829-40-4, CAS-No. 72857-31-9, CAS-No. 75348-22-0, CAS-No. 6737-68-4, CAS-No. 6737-70-8, CAS-No. 25729-56-0, CAS-No. 41578-10-3, CAS-No. 74634-30-3, CAS-No. 110652-64-7, CAS-No. 110652-65-8, CAS-No. 130584-12-2, CAS-No. 130584-14-4, CAS-No. 220965-23-1, CAS-No. 348574-64-1, 348574-69-6, CAS-No. 866997-49-1, CAS-No. 16346-96-6, CAS-No. 51097-77-9, CAS-No. 52607-54-2, CAS-No. 53302-28-6, CAS-No. 74440-69-0, CAS-No. 220965-16-2, CAS-No. 16325-99-8, CAS-No. 476208-42-1, CAS-No. 107535-87-5, CAS-No. 6408-52-2, CAS-No. 63572-80-5, CAS-No. 82-38-2, CAS-No. 2944-28-7, CAS-No. 2944-19-6, CAS-No. 4947-19-7, CAS-No. 5986-47-8, CAS-No. 33175-69-8, CAS-No. 4947-20-0, CAS-No. 63572-80-5, CAS-No. 681083-66-1, CAS-No. 73791-32-9, CAS-No. 52868-92-5, CAS-No. 16346-96-6, CAS-No. 86358-43-2, CAS-No. 4947-21-1, CAS-No. 42887-21-8 and CAS-No. 63786-05-0.

The dyes of formulae (101) and (102) are particularly preferred.

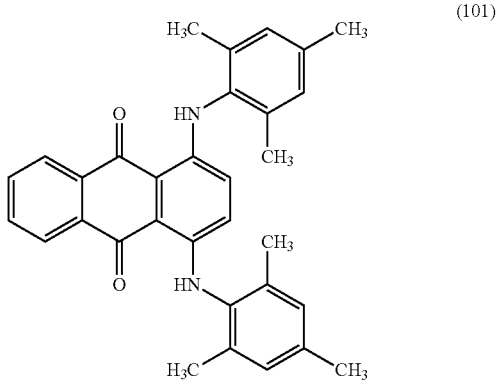

(101)

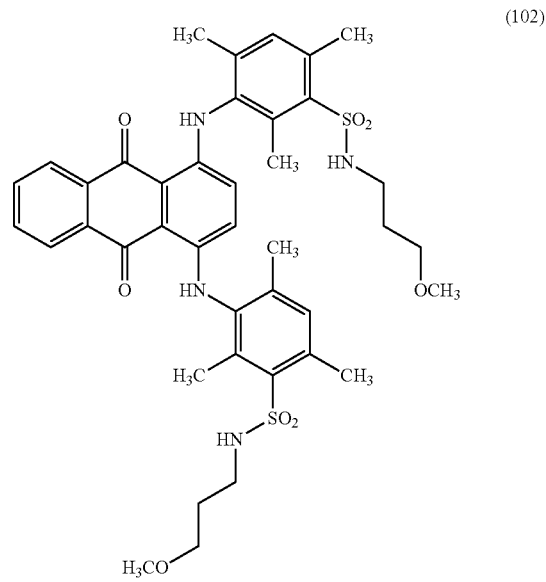

(102)

The dyes of formulae (1) to (4) can basically be applied in all known printing applications like rotary and flatbed screen printing, transfer printing and inkjet printing.

In a preferred embodiment of the invention the fibre material is treated with a printing paste according to the screen printing method.

Screen printing is a well-known technique that has been used in the textile industry for a long time. Compositions of suitable printing pastes and inks as well as the appropriate processing conditions are known to the person skilled in the art.

In a further preferred embodiment of the invention the fibre material is treated with a printing ink according to the inkjet printing method.

Ink-jet printing inks and processes have also been used for some time in the textile industry. They make it possible to do without the otherwise customary production of a printing stencil, so enabling considerable savings to be made in both cost and time.

In connection with the production of originals, in particular, it is possible to respond to changes within a much shorter time.

During ink-jet printing, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The inks can be prepared in customary manner by grinding the dyes to the appropriate particle size in the nanometer range and mixing together the individual components, if necessary in combination with suitable dispersing agents, in the desired amount of water and, optionally, co-solvents.

The present disclosure further relates to a process for printing cellulose textile fibre material or cellulose/polyester mixed textile fibre material according to the inkjet printing method, characterised in that the fibre material in a first step is treated with a water-soluble organic solvent having a boiling point >150° C. and subsequently is printed with an aqueous ink comprising at least one disperse dye of the formula (1), (2), (3) or (4) as defined above.

Purposively, a drying step is applied after the treatment with the water-soluble organic solvent.

The printings obtained by the process according to the invention are characterized by level colour shades, high colour strength and good in-use fastness properties, especially fastness to washing.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimetres.

The following dyes were used in the examples:

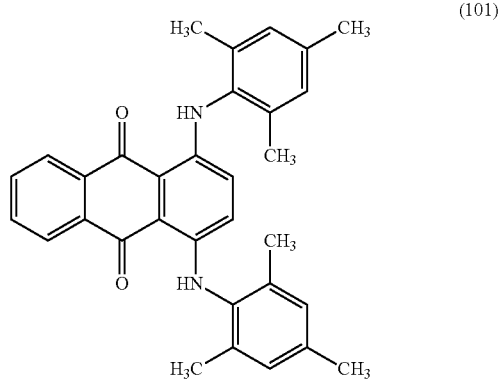

(101)

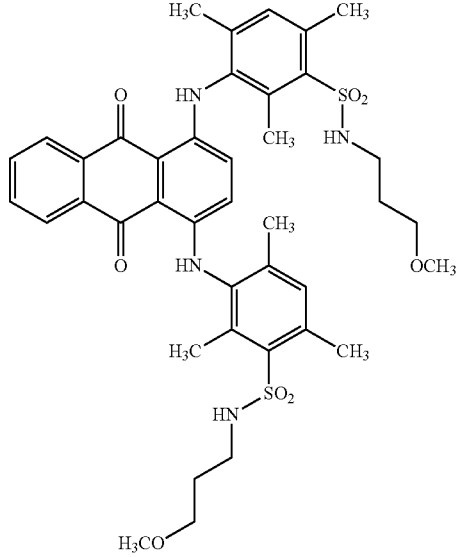

(102)

EXAMPLE 1

A cotton fabric (Reference Nr. 1-3011, CO-crettone bleached, 135 g/m², 30/30 tex) is padded at room temperature with an aqueous formulation containing 200 g/l of MACROGOL 400 EF (PEG, average molecular weight $M_w$=400, supplied by Brenntag), 40 g/l PREPAJET UNI (inkjet auxiliary, polyacrylic acid derivative, supplied by Huntsman) and 1 g/l ALBATEX AR (levelling agent, supplied by Huntsman) with a pick-up rate of 70-85%. After drying at 80-100° C. for 10 min, the thus prepared fabric is printed by ink-jet with an aqueous ink containing 4.38% by weight of a disperse dye of formula (102)
    30.0% by weight of glycerol (85%)
    4.28% by weight of a commercial water-soluble polymeric dispersant,
    1.00% by weight of a commercial tenside,
    0.26% by weight of a commercial defoamer, and
    60.07% by weight of deionized water.

After drying at 80-100° C. for 10 min, the printed fabric is fixed at 200° C. for 90 s.

After cooling down, the printed fabric is rinsed with cold soft water and finally washed with a solution of 1 g/l commercial tenside, rinsed and dried.

Deep blue prints of high color strength having good all-round fastness properties, especially washfastness, rubbing fastness and light fastness, are obtained.

Similar results and properties are obtained if the dried print is fixed at lower temperature with longer fixation time or if it is fixed with superheated steam at 180° C. for 8 min.

EXAMPLE 2

The same procedure as described in Example 1 is applied to a cotton/polyester fabric (Reference Nr. 7-3014, CO/PES 33/67, fixed, bleached, mercerized, 208 g/m², 30/30 tex) instead of a cotton fabric.

Similarly to cotton, deep blue prints of high color strength having good all-round fastness properties, especially washfastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

EXAMPLE 3

The same procedure as described in Example 1 is applied using an aqueous ink containing
- 3.24% by weight of a disperse dye of formula (101)
- 40.0% by weight of glycerol (85%)
- 4.50% by weight of a mixture of commercial water-soluble polymeric dispersants,
- 1.00% by weight of a commercial tenside, and
- 51.26% by weight of deionized water.

After drying at 80-100° C. for 10 min, the printed fabric is fixed at 200° C. for 90 s.

After cooling down, the printed fabric is rinsed with cold soft water and finally washed with a solution of 1 g/l commercial tenside, rinsed and dried.

Deep blue prints of high color strength having good all-round fastness properties, especially washfastness, rubbing fastness and light fastness, are obtained.

Similar results and properties are obtained if the dried print is fixed at lower temperature with longer fixation time or is fixed with superheated steam at 180° C. for 8 min.

EXAMPLE 4

The procedure described in Example 3 is applied to a cotton/polyester fabric (Reference Nr. 7-3014, CO/PES 33/67, fixed, bleached, mercerized, 208 g/m$^2$, 30/30 tex) instead of a cotton fabric.

Similarly to cotton, deep blue prints of high color strength having good all-round fastness properties, especially washfastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

EXAMPLE 5

Standard screen printing paste (flat bed or rotary) is applied according to a method similar to that described in WO2005/024123. Fixing and washing conditions are similar to those mentioned in Examples 1-4.

A stock paste P1 containing
- 84.9% by weight of deionized water,
- 10.0% by weight of Macrogol 400 EF,
- 5.0% by weight of a commercial thickener, and
- 0.1% by weight of a reduction inhibitor is prepared.

A cotton fabric (Reference Nr. 1-3011, CO-crettone bleached, 135 g/m$^2$, 30/30 tex) is screen printed at room temperature with a printing paste containing
- 88.66% by weight of stock paste P1,
- 1.50% by weight of a disperse dye of formula (102),
- 0.44% by weight of a commercial surfactant,
- 0.88% by weight of a glycol derivative,
- 0.01% by weight of a commercial defoamer, and
- 8.52% by weight of deionized water After drying at 80-100° C. for 10 min, the printed fabric is fixed at 200° C. for 90 s.

After cooling down, the printed fabric is rinsed with cold soft water and finally washed with a solution of 1 g/l commercial tenside, rinsed and dried.

Deep blue prints of high color strength having good all-round fastness properties, especially washfastness, rubbing fastness and light fastness, are obtained.

Similar results and properties are obtained if the dried print is fixed at lower temperature with longer fixation time or if it is fixed with superheated steam at 180° C. for 8 min.

EXAMPLE 6

The same procedure as described in Example 5 is applied to a cotton/polyester fabric (Reference Nr. 7-3014, CO/PES 33/67, fixed, bleached, mercerized, 208 g/m$^2$, 30/30 tex) instead of a cotton fabric.

Similarly to cotton, deep blue prints of high color strength having good all-round fastness properties, especially washfastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

EXAMPLE 7

The same procedure as described in Example 5 is applied using a stock paste P2 containing
- 82.52% by weight of deionized water,
- 12.40% by weight of Macrogol 400 EF,
- 4.98% by weight of a commercial thickener, and
- 0.10% by weight of a reduction inhibitor and a printing paste containing
- 75.90% by weight of stock paste P2,
- 2.00% by weight of a disperse dye of formula (101),
- 0.59% by weight of a commercial surfactant,
- 1.17% by weight of a glycol derivative,
- 0.02% by weight of a commercial defoamer, and
- 20.33% by weight of deionized water After drying at 80-100° C. for 10 min, the printed fabric is fixed at 200° C. for 90 s.

After cooling down, the printed fabric is rinsed with cold soft water and finally washed with a solution of 1 g/l commercial tenside, rinsed and dried.

Deep blue prints of high color strength having good all-round fastness properties, especially washfastness, rubbing fastness and light fastness, are obtained.

Similar results and properties are obtained if the dried print is fixed at lower temperature with longer fixation time or is fixed with superheated steam at 180° C. for 8 min.

EXAMPLE 8

The same procedure as described in Example 7 is applied to a cotton/polyester fabric (Reference Nr. 7-3014, CO/PES 33/67, fixed, bleached, mercerized, 208 g/m$^2$, 30/30 tex) instead of a cotton fabric.

Similarly to cotton, deep blue prints of high color strength having good all-round fastness properties, especially washfastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

TABLE 1

Color Coordinates and color depth measured according to the norm CIELAB 1976/DIN 6174, with D65/10 (Illuminant/Observer)

| Example # | L (Lightness) | a* | b* | C* (Chroma) | H (Hue) | RD (Reference Depth) |
|---|---|---|---|---|---|---|
| Example 1 | 43.99 | 8.29 | −47.58 | 48.30 | 279.88 | 0.48 |
| Example 2 | 49.36 | 4.73 | −41.14 | 41.41 | 276.55 | 0.29 |
| Example 3 | 40.00 | 0.00 | −43.53 | 43.53 | 270.01 | 0.72 |
| Example 4 | 41.99 | −0.41 | −41.69 | 41.69 | 269.44 | 0.28 |
| Example 5 | 41.73 | 5.00 | −40.67 | 40.98 | 277.00 | 0.52 |
| Example 6 | 38.77 | 6.65 | −39.96 | 40.51 | 279.45 | 0.62 |
| Example 7 | 37.62 | −0.29 | −37.04 | 37.05 | 269.55 | 0.74 |
| Example 8 | 36.23 | 0.08 | −38.28 | 38.28 | 270.11 | 0.85 |

The invention claimed is:

1. A process for printing cellulose textile fibre material or cellulose/polyester mixed textile fibre material, characterised in that the fibre material is treated with a printing paste or printing ink containing a disperse dye of the formula

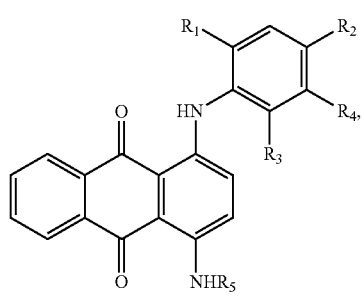
(1)

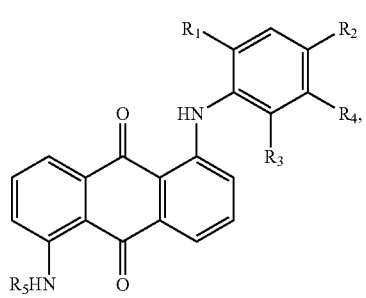
(2)

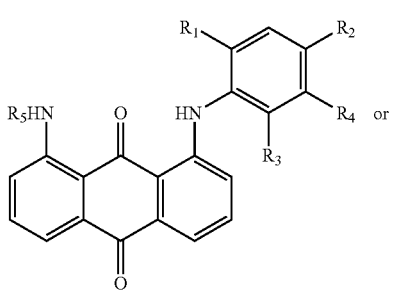
(3)

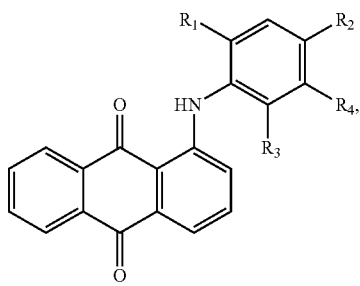
(4)

wherein
$R_1$-$R_3$ in formulas (1)-(4) are a $C_1$-$C_8$ alkyl,
$R_4$ denotes hydrogen, $C_1$-$C_8$ alkyl or a group of the formula —$SO_2$—$NR_6R_7$,
wherein $R_6$ and $R_7$ each independently of the other denote hydrogen,
$C_1$-$C_8$ alkyl which is unsubstituted or substituted by hydroxy, halogen, $C_1$-$C_8$ alkoxy or $C_6$-$C_{24}$ aryl, or
$C_6$-$C_{30}$ aralkyl which is unsubstituted or substituted by hydroxy, $C_1$-$C_8$ alkyl, $C_1$-$C_8$ alkoxy or halogen,
$R_5$ represents hydrogen, $C_1$-$C_8$ alkyl or a radical of the formula

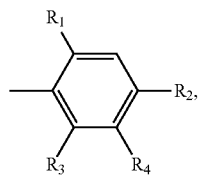
(5)

wherein $R_4$ is as defined above and $R_1$-$R_3$ in formula (5) are each independently of the other hydrogen, halogen, $C_1$-$C_8$ alkyl or $C_1$-$C_8$ alkoxy.

2. The process according to claim 1 wherein $R_4$ in formulas (1)-(4) denotes a radical of the formula —$SO_2$—$NR_6R_7$,
wherein $R_4$ in formula (5) denotes hydrogen, $C_1$-$C_8$ alkyl or a group of the formula —$SO_2$—$NR_6R_7$, and
$R_6$ and $R_7$ in $R_4$ of formulas (1)-(5) are as defined in claim 1.

3. The process according to claim 1, characterised in that the fibre material is treated with a printing paste or printing ink containing a disperse dye of the formula (1), (2) or (3), wherein $R_5$ is a radical of the formula (5) and wherein $R_1$-$R_3$ in formula (5) are $C_1$-$C_8$ alkyl.

4. The process according to claim 3, wherein $R_4$ in formula (5) is —$SO_2$—$NR_6R_7$.

5. The process according to claim 1, characterised in that the fibre material is treated with a printing paste or printing ink containing a disperse dye of the formula (1), wherein $R_1$-$R_3$ are $C_1$-$C_8$ alkyl,
$R_4$ is hydrogen or a radical of the formula —$SO_2$—$NR_6R_7$, wherein $R_6$ is hydrogen and $R_7$ is 3-methoxypropyl, and
$R_5$ is a radical of the formula (5), wherein $R_1$-$R_3$ are $C_1$-$C_8$ alkyl and $R_4$ is hydrogen or a radical of the formula —$SO_2$—$NR_6R_7$, wherein $R_6$ is hydrogen and $R_7$ is 3-methoxypropyl.

6. The process of claim 1, characterised in that the fibre material is treated with a printing paste according to the screen printing method.

7. The process of claim 1, characterised in that the fibre material is treated with a printing ink according to the inkjet printing method.

8. The process according to claim 7, wherein the fibre material in a first step is treated with a water-soluble organic solvent having a boiling point >150° C. and subsequently is printed with an aqueous ink comprising at least one disperse dye of the formula (1), (2), (3) or (4).

9. The process according to claim 8, characterised in that a drying step is applied after the treatment with the water-soluble organic solvent.

* * * * *